Patented Apr. 12, 1932

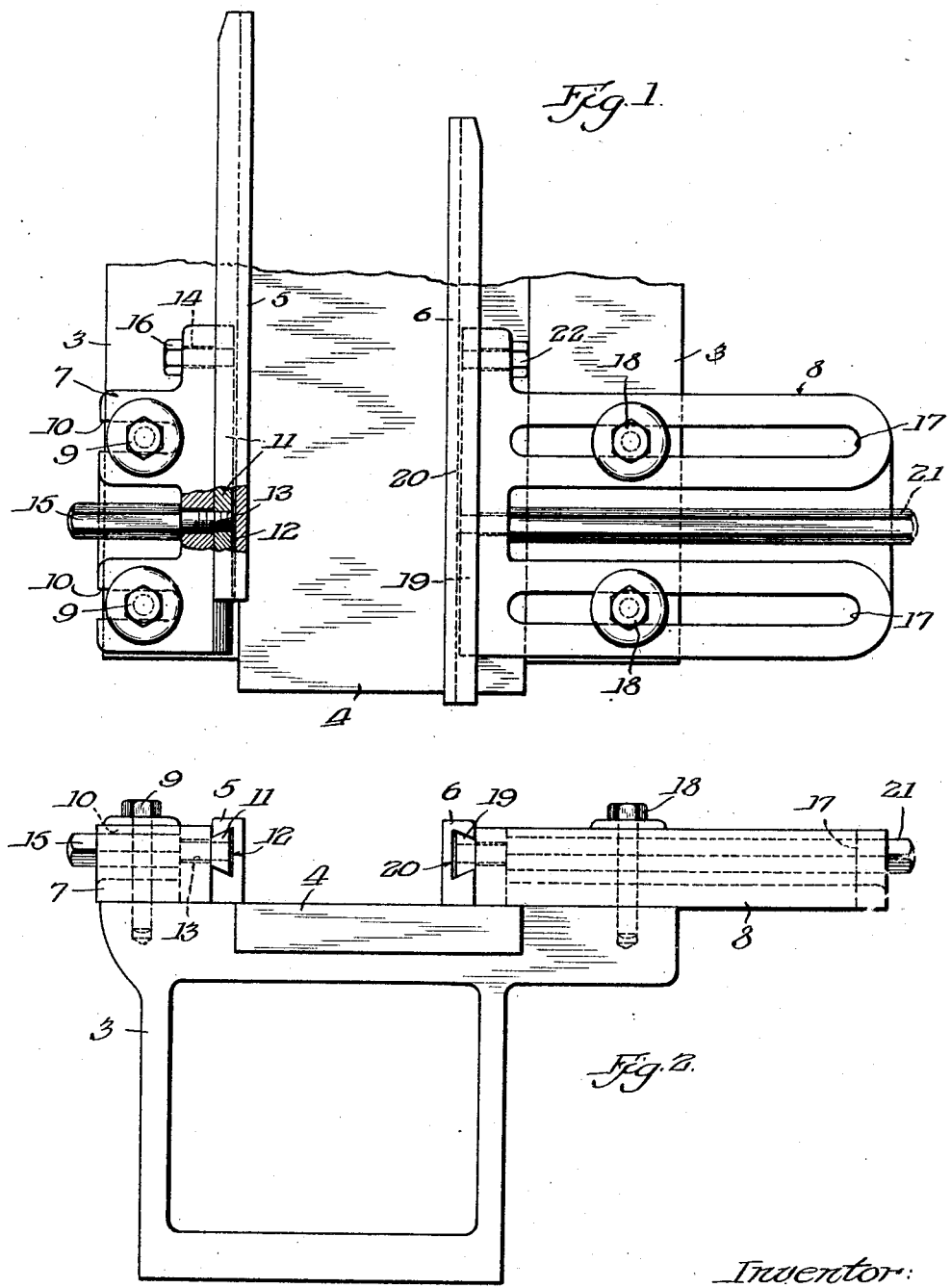

1,853,442

UNITED STATES PATENT OFFICE

THEODORE C. MANN, OF ROCKFORD, ILLINOIS, ASSIGNOR TO MATTISON MACHINE WORKS, OF ROCKFORD, ILLINOIS, A CORPORATION OF ILLINOIS

MOLDER

Application filed April 3, 1931. Serial No. 527,403.

The invention relates to wood-working machines of the type generally known as molders, and has for its general aim the provision of improved means for guiding the work in its passage through the machine.

The work guiding means commonly employed in machines of this type consists of guide bars arranged at opposite sides of the path of travel of the work over a horizontal support or table, a plurality of bars being arranged on each side of said line of travel in end to end relation. The object of the present invention is to provide means of an advantageous character for mounting such bars so that they shall be capable of quick and easy adjustment longitudinally with respect to the path of travel, as well as laterally thereof.

In view of the common practice of employing a plurality of bars on each side of the work, mounted so as to be capable of individual adjustment, I have deemed it necessary for the purpose of illustrating the present invention to show only two opposed bars.

In the accompanying drawings:

Figure 1 is a fragmentary plan view showing two guide bars as the same are mounted on the support or table of the machine in accordance with my invention.

Fig. 2 is an end elevational view of the machine and further illustrating the invention.

For purposes of illustration, I have shown the base or bed 3 of a molding machine, providing a table 4 on which the work is supported while being fed past the various cutters (not shown). The means for guiding the work in such passage through the machine is mounted upon the upper side of the base 3 at opposite sides of the table 4, and as illustrating my improved construction of such guide means I have shown two guide bars 5 and 6 arranged in opposed relation at one end of the base 3 and mounted on carriers 7 and 8 secured on the upper face of the base.

The carrier 7 is in the form of a block secured to the top of the base by means of screws 9 entered through open ended slots 10 formed in the block and anchored at their lower ends in tapped holes at the top of the base. Said block has a vertical inner face to which is secured the guide bar 5. Thus the carrier is mounted on the base for adjustment laterally thereof.

In mounting the bar 5 on the carrier, so as to be adjustable endwise relative thereto, I provide interengaging parts on the carrier and on the bar to form a dovetail connection therebetween. Thus the carrier has secured to its upright face an elongated member 11 forming the tenon of the dovetail connection, and the bar 5 has formed in its outer face an undercut groove 12 for receiving the tenon. The tenon is of wedge-shaped cross section and is made of a size such as to permit free sliding movement of the bar relative thereto when it is desired to adjust the bar endwise, but means is provided for holding the bar against such endwise movement. This means comprises a pair of screws 13 and 14 entered through horizontally disposed holes in the carrier block and threaded into the tenon 11. The screws 13 and 14 have heads 15 and 16, respectively, providing shoulders engaging with the block at the outer ends of the screw holes so that the screws may be turned and thus move the tenon laterally in its groove 12.

It will be seen that by properly proportioning the interengaging parts of the dovetail connection, the tenon may be moved laterally of its groove by means of the screws 13 and 14 so as to clamp the bar 5 with wedging action rigidly in position on the carrier; and when desired such clamping engagement may be released to permit of endwise adjustment of the bar. The head 15 of the screw 13 is shown elongated in form to render the same more readily accessible.

The construction employed for mounting the guide bar 6 on the opposite side of the path of travel is in all respects substantially similar to that employed in the case of the guide bar 5. In this instance, the carrier block 8 is of substantially greater width than block 7 and is provided with elongated slots 17 closed at both ends and receiving clamping screws 18. The dovetail connection between the bar 6 and the block 8 is provided by a tenon 19 engaging in an undercut groove 20 in the outer face of the bar 6; and the bar is clamped and released for purposes of adjustment by the operation of screws 21 and 22.

It has been found that the construction and arrangement thus provided is substantially superior to methods previously employed, first because of the ease with which the guide bars may be fastened and released, second because of the number of possible adjustments within desirable ranges is unlimited, and third because of the simplicity of the construction coupled with strength and rigidity.

I claim as my invention:

1. In a molding machine, the combination of a base having a work guiding means comprising a pair of guide bars, carriers for the respective bars mounted on the base at opposite sides of the path of travel of the work and adjustable toward and from said path, said bars and carriers having interengaging parts providing dovetail connections between them so as to render the bars slidable endwise relative to the carriers, and means on said carriers operable to hold said bars against endwise movement.

2. A work guiding means for molding machines comprising, in combination, an elongated guide bar, a carrier for said bar adapted to be mounted on the machine at one side of the path of travel of the work and adjustable toward and away from said path, said bar and its carrier having interengaging parts providing a dovetail connection between them permitting the bar to be slidable relative to the carrier longitudinally of said path, and means acting upon one of said interengaging parts to clamp them together.

3. A work guiding means for molding machines comprising, in combination, an elongated guide bar, a carrier for said bar adapted to be mounted on the machine at one side of the path of travel of the work, means providing a dovetail connection between the bar and the carrier comprising a wedge-shaped tenon on the carrier, said bar having an undercut groove loosely receiving said tenon, and means mounted in the carrier and supporting said tenon thereon, said means being operable to move the tenon into wedging engagement with the groove in the bar whereby to clamp the bar against movement relative to the carrier.

4. In a molding machine or the like, the combination of a base having a table over which the work is moved over a rectilinear path, work guiding means upstanding from said table along one side of said path for engaging the adjacent side of the work, said means comprising a guide bar extending longitudinally along said path, and a carrier for said bar mounted on said base at one side of said path for adjustment toward and away from the path, said bar and said carrier having interengaging parts providing a connection permitting longitudinal sliding movement of the bar relative to the carrier, and means acting upon one of said parts to clamp the parts together.

In testimony whereof, I have hereunto affixed my signature.

THEODORE C. MANN.